(12) United States Patent
Jagani (10) Patent No.: US 6,854,404 B2
(45) Date of Patent: Feb. 15, 2005

(54) ADAPTIVE AGRICULTURAL MACHINE

(75) Inventor: Mansukhbhai Ambabhai Jagani, Devaliya Mota (IN)

(73) Assignee: Society for Research and Initiatives for Subtainable Technologies and Institions, Ahmedabad (IN)

( * ) Notice: Subject to any disclaimer, the term of this patent is extended or adjusted under 35 U.S.C. 154(b) by 0 days.

(21) Appl. No.: 10/081,507

(22) Filed: Feb. 22, 2002

(65) Prior Publication Data

US 2003/0159632 A1 Aug. 28, 2003

(51) Int. Cl.$^7$ .......................... B60K 17/28; B60K 25/08
(52) U.S. Cl. ..................... 111/120; 180/53.6; 180/53.8; 172/35; 172/125; 239/172; 239/723; 239/289; 111/200
(58) Field of Search ................................. 111/200, 900, 111/118, 120, 127; 180/310, 900, 211, 21, 53.1–53.8, 213, 223, 224; 172/36, 48, 118, 123, 125, 35; 239/172, 722, 723, 289

(56) References Cited

U.S. PATENT DOCUMENTS

| | | | | |
|---|---|---|---|---|
| 2,230,749 A | * | 2/1941 | Hebert | |
| 3,298,453 A | * | 1/1967 | Bobard | |
| 4,246,779 A | * | 1/1981 | Leone, Sr. | 73/862.09 |
| 4,690,235 A | | 9/1987 | Miyakoshi | 180/210 |
| 6,550,575 B2 | * | 4/2003 | Spencer et al. | 182/63.1 |
| 2003/0034205 A1 | * | 2/2003 | Spencer et al. | 182/63.1 |

FOREIGN PATENT DOCUMENTS

FR 2551323 * 3/1985

* cited by examiner

Primary Examiner—Christopher J. Novosad
(74) Attorney, Agent, or Firm—Testa, Hurwitz & Thibeault, LLP (57) ABSTRACT

This invention provides devices and methods for adapting a motorcycle for use with an agricultural system. In a preferred embodiment, the agricultural system includes a motorcycle drive unit adapted for removable attachment to a tool assembly. In a further embodiment of the invention, power transmission from the drive unit to a tool assembly drive axle is at reduced speed and increased torque relative to the motorcycle drive unit output.

10 Claims, 9 Drawing Sheets

ADAPTIVE AGRICULTURAL MACHINE

FIELD OF THE INVENTION

The invention relates, generally, to agricultural machines and, in particular, to agricultural machines propelled by an internal combustion engine.

BACKGROUND OF THE INVENTION

Farm machinery is important to developing countries because it can be used to greatly increase agricultural productivity. Increased agricultural productivity benefits the health of a country's residents by improving nutrition and may improve a country's economic condition by allowing the country to export produce. However, a piece of farm machinery is large and expensive to own and operate. Residents in many poorer regions of the world lack the financial resources necessary to own and operate modern farm tractors and other pieces of farm machinery. Additionally, remote and inaccessible locations around the globe have limited access to modern farm equipment. Further, even where available, it is impractical to use modern farm machinery in poor or remote regions because of limited spare parts availability and the complexity of repairs.

Motorcycles are often used for transportation in poorer and remote regions. Motorcycles are preferred because they are small, economical and convenient to operate on narrow or unpaved roads and trails. The traditional motorcycle as supplied by an original equipment manufacturer ("OEM") is operated by a rider who sits on a seat astride the frame and engine. The engine supplies power to the rear axle and rear wheel via a chain and sprocket system. Motorcycle steering is accomplished using a set of handle bars to pivot the front fork and tire in the direction of travel.

Because motorcycles are relatively lightweight, have a compact structure, manual steering, and lack an external skin or body, generally, motorcycles are much less complex than farm machinery. Consequently, motorcycles require fewer specialized parts and less complex repair procedures than farm machinery. Specialized parts and complex repairs tend to increase operating costs and the skill level and tooling required to maintain equipment in operating condition.

SUMMARY OF THE INVENTION

In one aspect, the invention features an agricultural system designed for farming that includes a motorcycle drive unit and a tool assembly. The motorcycle drive unit is removably attached to the tool assembly. Further advantages are provided when the preceding features are retrofitted to existing systems.

In another aspect, the invention features a tool assembly that includes a structural chassis and an axle with a first wheel disposed at the first end of the axle and a second wheel disposed at the second end of the axle. In another embodiment, the tool assembly includes a transmission unit with a differential gear box located between the first and second wheels. Additional advantages are provided when the tool assembly includes a lifting mechanism used for farm implements. Further advantages are provided when the lifting mechanism includes a multi-purpose tool bar. Still more advantages are provided when the tool assembly includes a braking system.

The present invention also provides a method of adapting a motorcycle for farming. The method includes removing a motorcycle drive wheel and a motorcycle drive axle from a motorcycle drive unit, attaching a tool assembly to the motorcycle drive unit, and installing a transmission unit for power delivery from the motorcycle drive unit to a tool assembly axle. The power delivery is at a reduced speed and increased torque relative to the speed and torque previously delivered to the motorcycle drive axle.

In a further aspect, the tool assembly is capable of being attached to an unmodified motorcycle drive unit. The tool assembly also includes a transmission unit capable of being connected to an unmodified motorcycle drive unit output.

BRIEF DESCRIPTION OF THE DRAWINGS

The foregoing and other objects, aspects, features, and advantages of the invention will become more apparent from the following description with reference to the figures in which.

DETAILED DESCRIPTION

Figure 1:
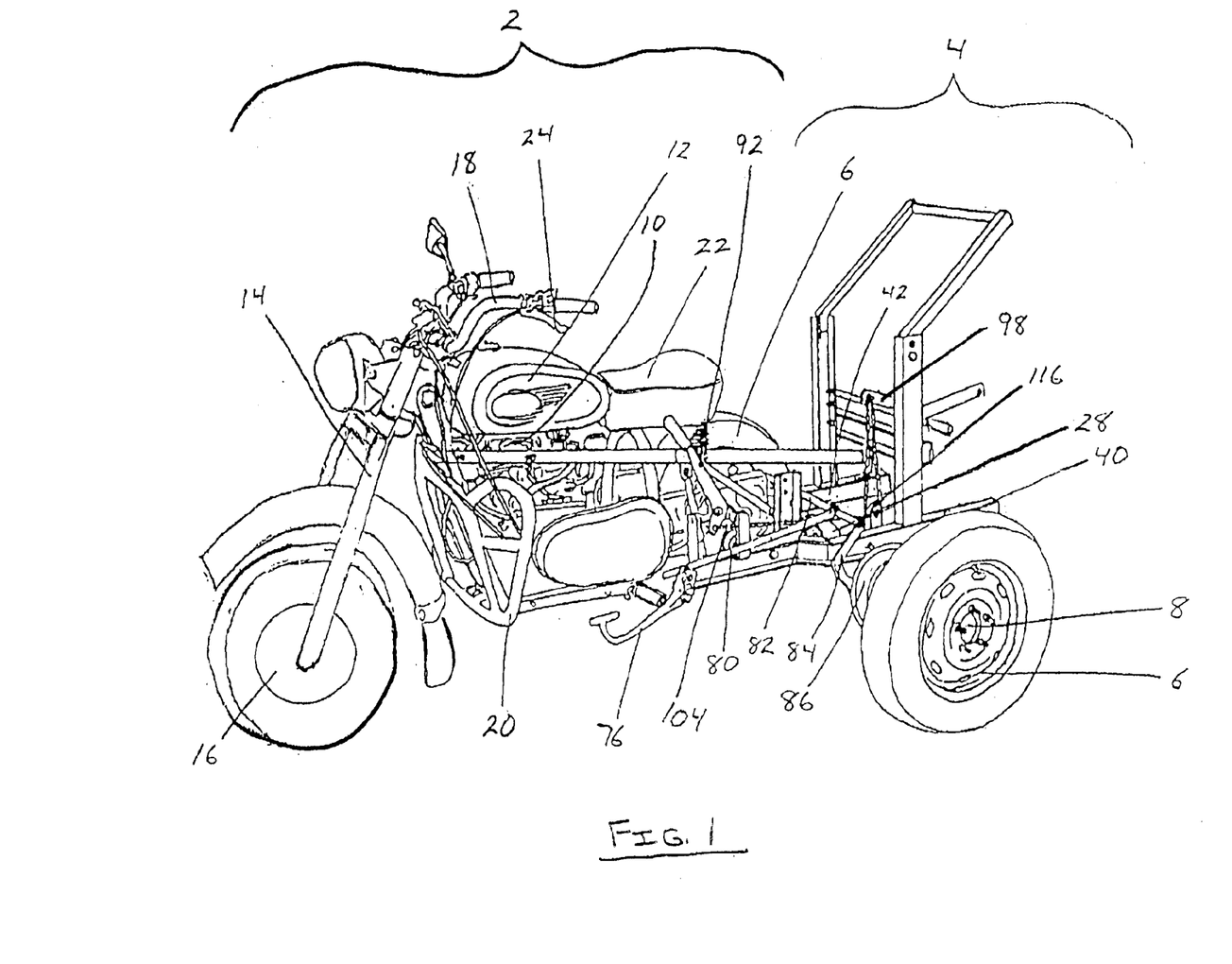
FIG. 1 is a perspective view of an embodiment of an agricultural system in accordance with the invention.

Referring to FIG. 1, an embodiment of a motorcycle adapted for use as part of an agricultural system is shown. A motorcycle drive unit 2 of an OEM motorcycle is shown attached to a tool assembly 4 to form an agricultural system. The motorcycle drive unit 2 has the components generally found in OEM supplied motorcycles. However, in the present use, the rear wheel (not shown), rear axle (not shown) and rear wheel brake hardware (not shown) are removed and replaced with rear wheels 6, axle 8 and brake system (described in FIG. 4) of the tool assembly 4. For added flexibility, the tool assembly 4 is removably attached to the unmodified motorcycle drive unit 2 permitting relatively easy conversion of the agricultural system back to a standard motorcycle.

In FIG. 1, the motorcycle drive unit 2 comprises an engine 10, fuel tank 12, front fork 14, front wheel 16, handle bars 18, frame 20, and seat 22. Additionally, control levers 24 are located on opposite ends of the handle bars 18. Generally, at least one of the control levers 24 operates a clutch (not shown) when squeezed. In its OEM supplied form, the motorcycle power output includes a chain drive (not shown) that connects to a sprocket (not shown) on the originally supplied rear axle (not shown). A chain drive system remains in use with the agricultural system. However, the tool assembly 4 includes a transmission unit 28 (partially obscured) such that the axle 8 rotates at a reduced speed and increased torque relative to the speed and torque of the rear axle in the OEM motorcycle.

Figure 2:
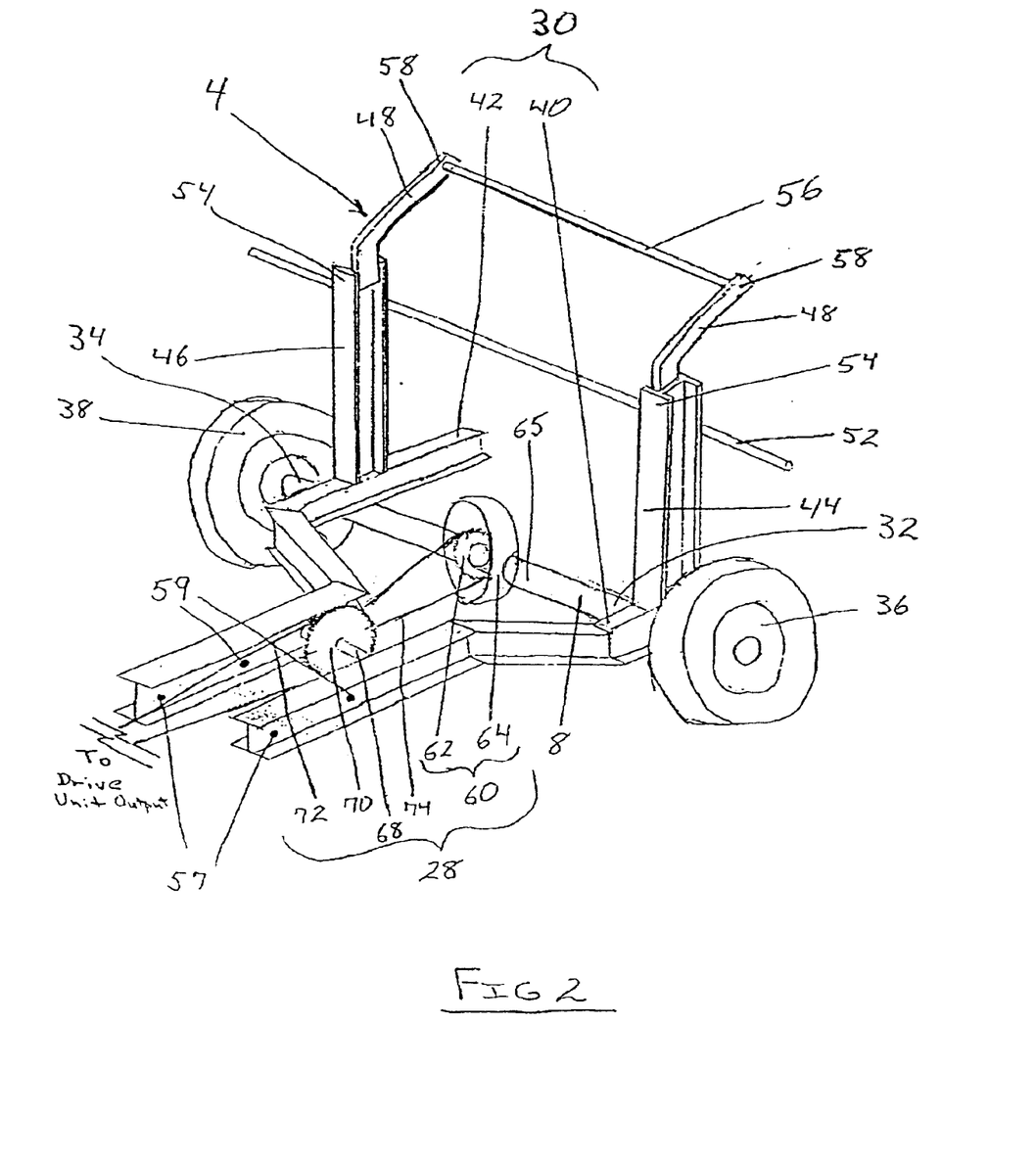
FIG. 2 is a perspective view of an embodiment of a tool assembly of the agricultural system of FIG. 1.

Referring to FIG. 2, the tool assembly 4 includes a chassis 30, and axle 8 having a first end 32 and a second end 34. Axle 8 has attached a first wheel 36 located at the first end 32 and a second wheel 38 located at the second end 34. Axle 8 is attached to the underside of the first and second horizontal members 40, 42. Axle 8 is oriented perpendicular to the first and second horizontal members 40, 42. A first vertical post 44 and second vertical post 46 provide support structure for attachment of a multi-purpose tool bar (not shown) and farm implements (not shown). An angled support member 48 is located at the top of each post 44, 46.

The chassis 30 is assembled using welded construction or other suitable fastening methods such as bolting, screwing, riveting and the like. A horizontal support arm 52 is attached to an upper end 54 of each vertical post 44, 46. In one embodiment, the horizontal support arm 52 extends substantially perpendicular to the vertical posts 44, 46 in a direction parallel to the direction of axle 8. A stabilizer 56 is attached to the distal end 58 of each angled support member 48. The chassis 30, horizontal members 40, 42, posts 44, 46, angled support members 48, horizontal support arm 52, and stabilizer 56 are made out of steel, iron, aluminum or other material having a suitable strength to weight ratio.

The chassis 30 attaches to the motorcycle drive unit 2 via a first attachment point 57 and a second attachment point 59 located in horizontal members 40, 42. Each of the first and second attachment points 57, 59 are secured to the motorcycle frame (item 20, FIG. 1).

As shown in FIG. 2, the transmission unit 28 includes the differential gear box 60 with third sprocket 62 and gear box cover 64 located in an axle central region 65. A shaft 68, on which a first sprocket 70 is located, is secured to the chassis 30. A first drive chain 72 connects the first sprocket 70 to the motorcycle drive unit output (not shown). A second drive chain 74 connects a second sprocket (not shown) to the third sprocket 62 located in gear box 60.

Figure 3:
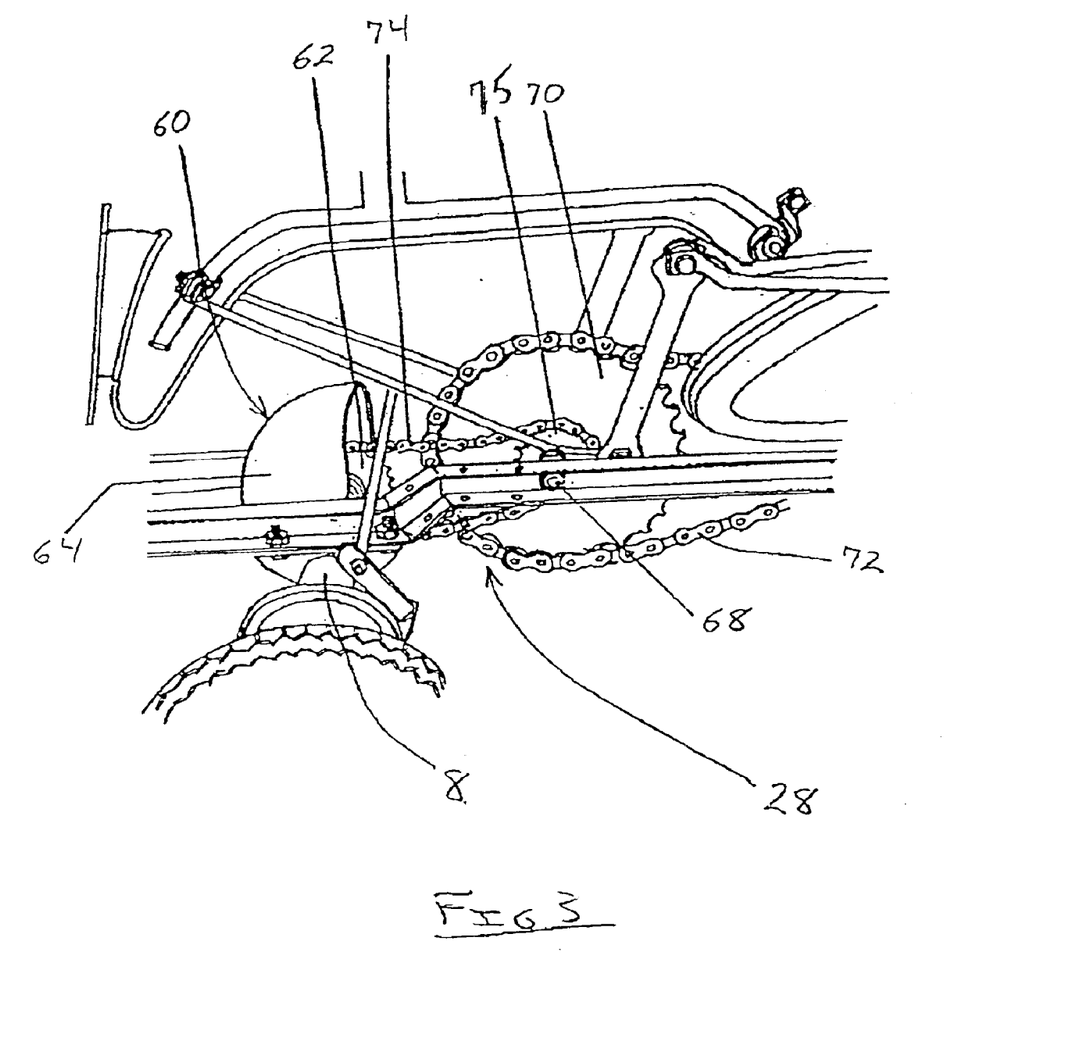
FIG. 3 is a perspective view of an embodiment of a transmission unit of the agricultural system of FIG. 1.

FIG. 3 shows the transmission system in greater detail. In FIG. 3, the second sprocket 75 is shown on shaft 68. Second sprocket 75 and the third sprocket 62 are connected by second drive chain 74. The third sprocket 62 is attached to axle 8. Thus, the transmission unit 28 can be connected to an unmodified motorcycle drive unit output (not shown).

Chain drive systems are often used to create a second power output derived from a first power output. The RPM and torque of the first power output may be converted when power is transferred from the first power output to the second power output. The RPM-torque conversion is accomplished by using a second power output sprocket having a different diameter than the first power output sprocket. In the embodiment of the agricultural system shown in FIG. 3, the motorcycle drive unit output sprocket (not shown) is a first power output that supplies power to the first sprocket 70 to create a second power output. As described herein, the power output of the first sprocket 70 is directly transferred to the second sprocket 75. The second sprocket 75 transfers the power output of first sprocket 70 to third sprocket 62. The third sprocket 62, in turn, generates a third power output that is supplied to axle 8.

In the embodiment shown in FIG. 3, two speed-torque conversions occur. The first sprocket 70 provides an initial speed-torque conversion because it has a larger diameter than the motorcycle drive unit output sprocket (not shown). Because the two sprockets are both connected to the first drive chain 72, the large first sprocket 70 has a reduced RPM as compared with the smaller drive unit output sprocket (not shown). However, because the RPM is a function of sprocket diameter, the torque and RPM produced by the first sprocket 70 vary inversely with one another. Thus, the first sprocket 70 produces greater torque than the drive unit output sprocket (not shown).

The speed and torque of the first sprocket 70 are directly transferred to the second sprocket 75 because the first and second sprockets 70, 75 rotate on a common shaft 68. The second speed-torque conversion occurs via the interconnection of the second and third sprockets 75, 62. The third sprocket 62 has a larger diameter than the second sprocket 75. The increased diameter of third sprocket 62 leads to a second torque increase and RPM decrease. Thus, the configuration of transmission unit 28 provides an increased torque-decreased RPM power transfer from the motorcycle drive unit output (not shown) to axle 8.

The gear ratio of the transmission unit 28 provides the agricultural system with the proper speed and torque to perform farming tasks. In one embodiment, the first sprocket 70 has fifty-four teeth, the second sprocket 75 has fifteen teeth and the third sprocket 62 has thirty-two teeth. However, the sprocket configuration and size can be varied to suit the specific speed-torque requirements of an agricultural application. Additionally, although gear box 60 is shown located in axle central region 65 (FIG. 2), it will be understood by those skilled in the art that the gear box 60 can be located at any point on axle 8 where space permits so long as it can be connected to the remainder of the transmission unit 28.

Figure 4:
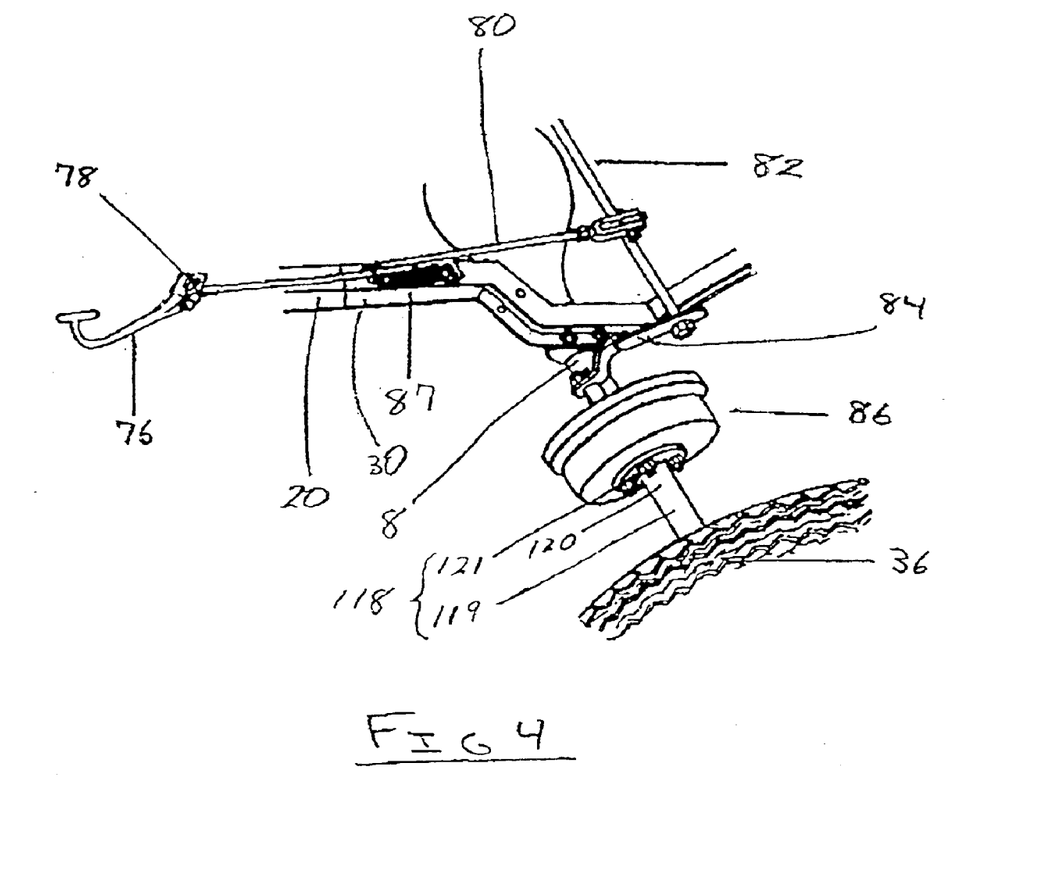
FIG. 4 is a perspective view of an embodiment of a brake system of the agricultural system of FIG. 1.

The tool assembly 4 is also equipped with a brake system, as shown in FIG. 4. The brake system allows a user to slow down or stop the agricultural system by pushing down on a brake pedal 76 located adjacent the bottom of motorcycle drive unit frame 20. A brake pedal proximate end 78 is connected to frame 20 and a first connecting rod 80. The first connecting rod 80 is slidably secured to chassis 30, and is connected to a second connecting rod 82. The second connecting rod 82 is connected to at least one operating rod 84. The operating rod 84 is connected to at least one brake shoe (not shown) located inside a brake housing 86. In one embodiment, two brake housings 86 are employed. A brake housing 86 is located at both the axle first end and axle second end (items 32, 34, FIG. 2) and second connecting rod 82 is connected to operating rods 84 (one of two shown), located adjacent each brake housing 86 (one of two shown). A connecting rod spring 87 is attached between the chassis 30 and the first connecting rod 80.

Figure 5A:
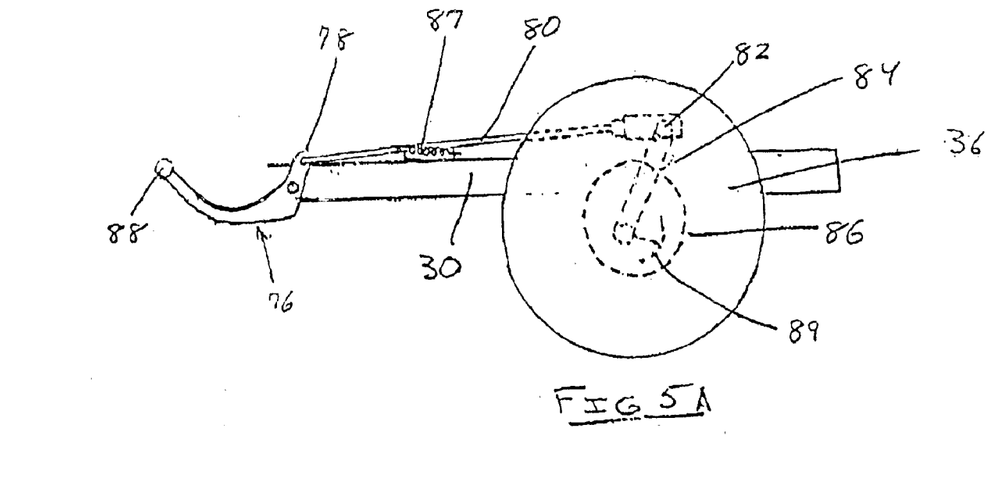
FIGS. 5A–5B are side views of the brake system of FIG. 4.
Figure 5B:
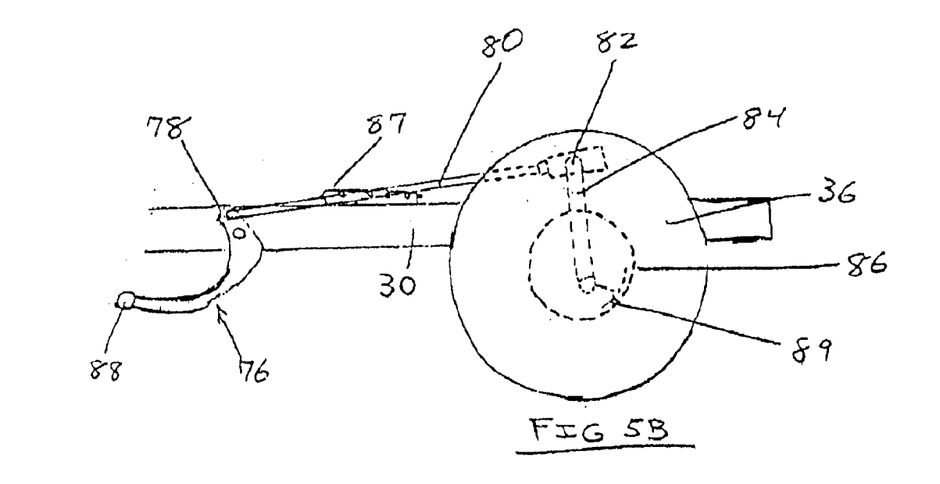

FIGS. 5A and 5B show the operation of the brake system. FIG. 5A is a view with the brake in its inactive state. FIG. 5B is a view with the brake in its active state. In FIGS. 5A and 5B the first connecting rod 80 is shown partially in phantom. Second connecting rod 82, operating rod 84, brake housing 86, and brake shoe 89 are shown entirely in phantom. The brake pedal 76 is pivotally mounted to the frame 20 such that a brake pedal distal end 88 is free to receive pressure from the operator's foot. The connecting rod spring 87 applies a spring bias that pulls the first connecting rod 80 toward the rear of chassis 30. The motion of the first connecting rod 80 rotates the brake pedal 76 clockwise when the system is inactive. The operating rod 84 also rotates clockwise toward the rear of chassis 30 when the brake is inactive.

The brake system is activated by depressing the brake pedal distal end 88. The brake pedal proximate end 78 rotates counterclockwise in response to downward pressure applied to the brake pedal distal end 88 by the operator's foot. The downward pressure overcomes the bias force provided by the connecting rod spring 87 and moves the first connecting rod 80 forward as the brake pedal 76 is depressed. The connecting rod spring 87 is stretched to its maximum length when the brake pedal 76 is fully depressed.

FIG. 5B shows the brake system in its activate position with the first connecting rod 80 moved forward. To prevent the engine (item 10, FIG. 1) from stalling or continuing to propel the agricultural system when the brake system is activated, the operator engages a clutch (not shown) by squeezing control lever (item 24, FIG. 1) when the brake system is activated. The clutch (not shown) disconnects the motorcycle drive unit output (not shown) from the engine (item 10, FIG. 1) when engaged.

As a result of movement of the first connecting rod 80, the second connecting rod 82 and operating rod 84 also rotate forward. The forward rotation of the operating rod 84 presses the brake shoe 89 against the interior of brake housing 86. The rotation of the brake housing 86 and rear axle (item 8, FIG. 4) are stopped by the friction created between the brake shoe 89 and brake housing 86. Thus, the agricultural system may be slowed or stopped.

The rearward bias of connecting rod spring 87 on first connecting rod 80 forces the first connecting rod 80 toward the rear of chassis 30 when pressure is removed from the brake pedal distal end 88. As a result, the brake pedal proximate end 78, second connecting rod 82 and operating rod 84 rotate to the rear in a clockwise direction. The movement of operating rod 84 withdraws the brake shoe 89 from contact with the brake housing 86 and the brake system returns to the inactive position shown in FIG. 5A.

Figure 6:
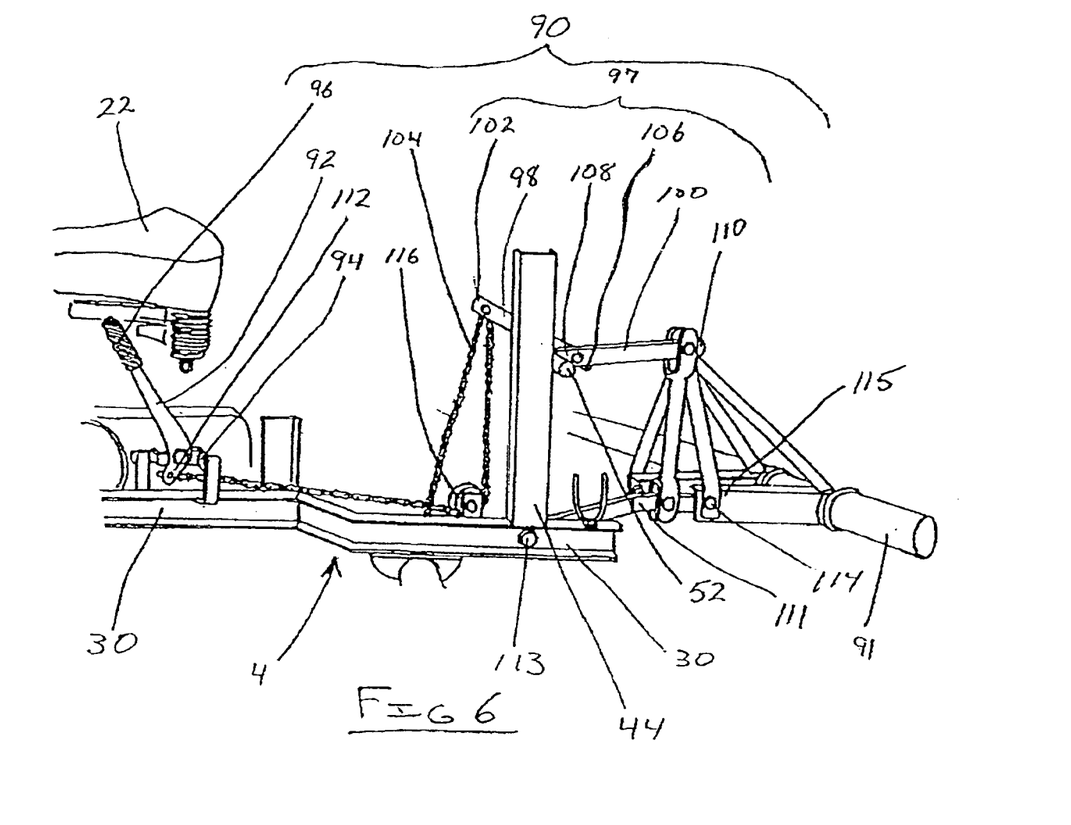
FIG. 6 is a perspective view of an embodiment of a lifting mechanism of the agricultural system of FIG. 1.

To ease the installation and removal of farm implements 91, a lifting mechanism 90, FIG. 6, is also included with the tool assembly 4. The lifting mechanism 90 is used to raise and lower the attached farm implements 91. The lifting mechanism 90 includes a lever 92 pivotally attached to a cross-arm 94 which is secured to chassis 30. A lever distal end 96 is located adjacent the seat 22. A multi-purpose tool bar 97 is connected to the tool assembly chassis 30 via vertical post 44. A first connecting link 98 and a second connecting link 100 are pivotally connected adjacent the horizontal support arm 52, between the first post 44 and second post (item 46, FIG. 2). A first connecting link front end 102 is attached to an operating line 104 while the first connecting link back end 106 is pivotally attached to a second connecting link front end 108.

Farm implements 91 are pivotally connected to a second connecting link back end 110. In the embodiment shown in FIGS. 6, 7A and 7B, the farm implement 91 also includes a tongue 111 that is pivotally connected to first connection point 113, located on chassis 30, and second connection point 114, located at a farm implement front end 115.

The operating line 104 is connected between an operating lever proximate end 112 and the tool assembly chassis 30. Between these two end points, operating line 104 is routed through a pulley 116 and connected to first connecting link front end 102. In the embodiment of FIG. 6, the operating line 104 is a chain. However, operating line 104 can be manufactured from other materials such as wire, wire rope, synthetic cord, natural cord and the like so long as the operating line 104 has the flexibility to work in a pulley system and the strength required to raise and lower farm implements 91.

Figure 7A:
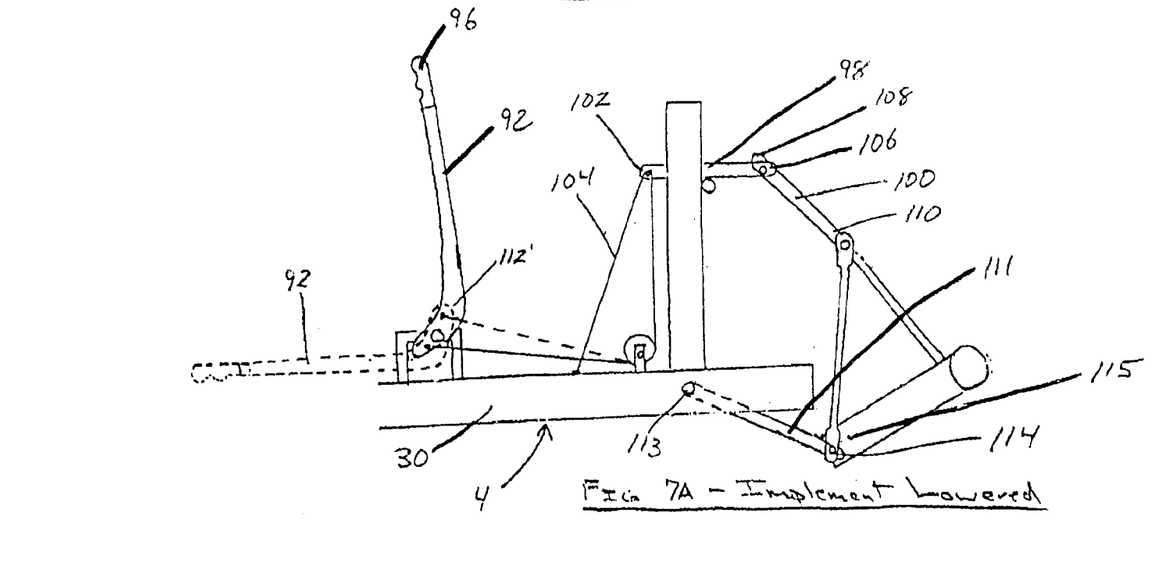
FIGS. 7A–7B are side views of the lifting mechanism of FIG. 6.
Figure 7B:
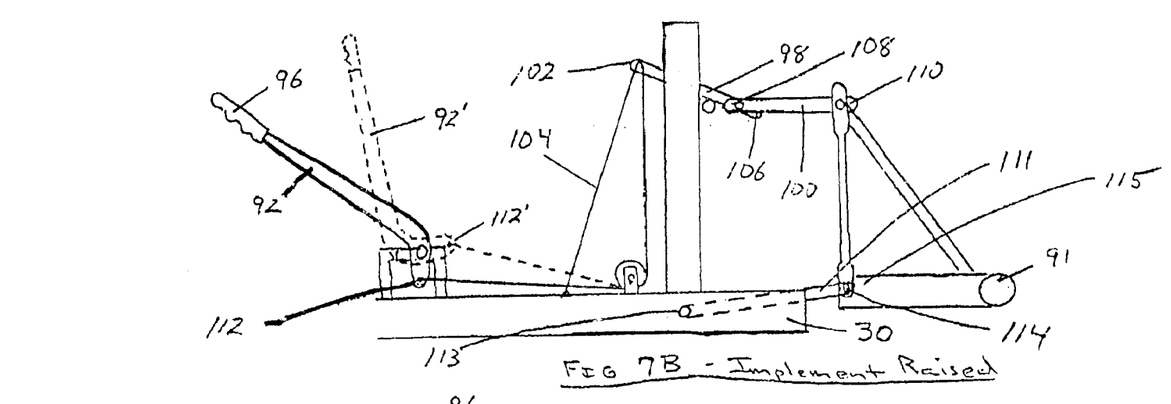

When the farm implement 91 is first attached to the tool assembly 4 the lever 92 is in the rear position, as shown in FIG. 7A. The lever 92 is rotated forward in the counter-clockwise direction, to raise the farm implement front end 115. As shown in FIG. 7B, the pivoting action of lever 92 drives the lever proximate end 112 toward the rear of chassis 30 when the lever distal end 96 is moved forward. In response, the first connecting link front end 102 is raised upward and the first connecting link back end 106 is lowered as the weight of the farm implement 91 is applied to the first connecting link back end 106 via second connecting link 100. The second connecting link front end 108 lowers and second connecting link back end 110 raises, as a result. The farm implement 91, connected at second connecting link back end 110, is raised upward along with the second connecting link back end 110. The higher the second connecting link back end 110 travels the higher the farm implement front end 115 is raised. The tongue 111 assists in translating the tool bar (item 97, FIG. 6) motion into vertical lift by minimizing travel of the farm implement front end 115 away from chassis 30.

The farm implement 91 is lowered when the lever 92 is rotated clockwise. As shown in FIG. 7A, the pivoting action of lever 92 drives the lever proximate end 112 toward the front of chassis 30 when lever distal end 96 is moved rearward. Clockwise rotation of the lever proximate end 112 creates tension on the operating line 104 and the first connecting link front end 102 is pulled downward. As a result, the first connecting link back end 106 is raised along with the second connecting link front end 108. In response, the second connecting link back end 110 moves downward and presses the farm implement front end 115 lower. Here, the tongue 111 assists in translating the tool bar (item 97, FIG. 6) motion into vertical depression by minimizing the forward travel of farm implement front end 115.

An alternate embodiment, shown in phantom in FIGS. 7A and 7B, results in a lifting mechanism 90 with an operating stroke that is the reverse of the operation just described. The lever 92' is configured with the proximate end 112' pointing toward the rear when the lever 92' is in the raised position as shown in FIG. 7B. For example, the farm implement front end 115 is raised when the lever 92' is rotated clockwise. The farm implement front end 115 is lowered when the lever 92' is rotated counterclockwise.

Lifting mechanism 91 complexity is reduced because it provides a mechanical advantage that allows the user to raise and lower heavy farm implements 91 without the aid of hydraulics or other more complicated hardware. The reduced complexity results in a device that is less costly to own and operate because it can be repaired using commonly available parts by those who possess commonly understood mechanical skills.

The tool assembly axle 8 also includes track width adjustment. Track width adjustment allows the user to adjust the horizontal distance between first and second wheels 36, 38. The track width adjustment feature increases agricultural system utility because the system can be adapted for a variety of agricultural practices. For example, track width adjustment allows the agricultural system to accommodate varied crop spacing and farm implements 91. FIG. 4 shows a spacer 118 installed between the brake housing 86 and the first wheel 36. In one embodiment, shown in FIG. 4, spacer 118 has a cylindrical mid-section 119 with a spacer first end 120. A first spacer flange 121 located at the spacer first end 120 is attached to the brake housing 86. A second spacer flange (not shown), identical to the first spacer flange 121, is used to attach the spacer second end (not shown) to the first wheel 36.

Figures 8A, 8B, 8C:
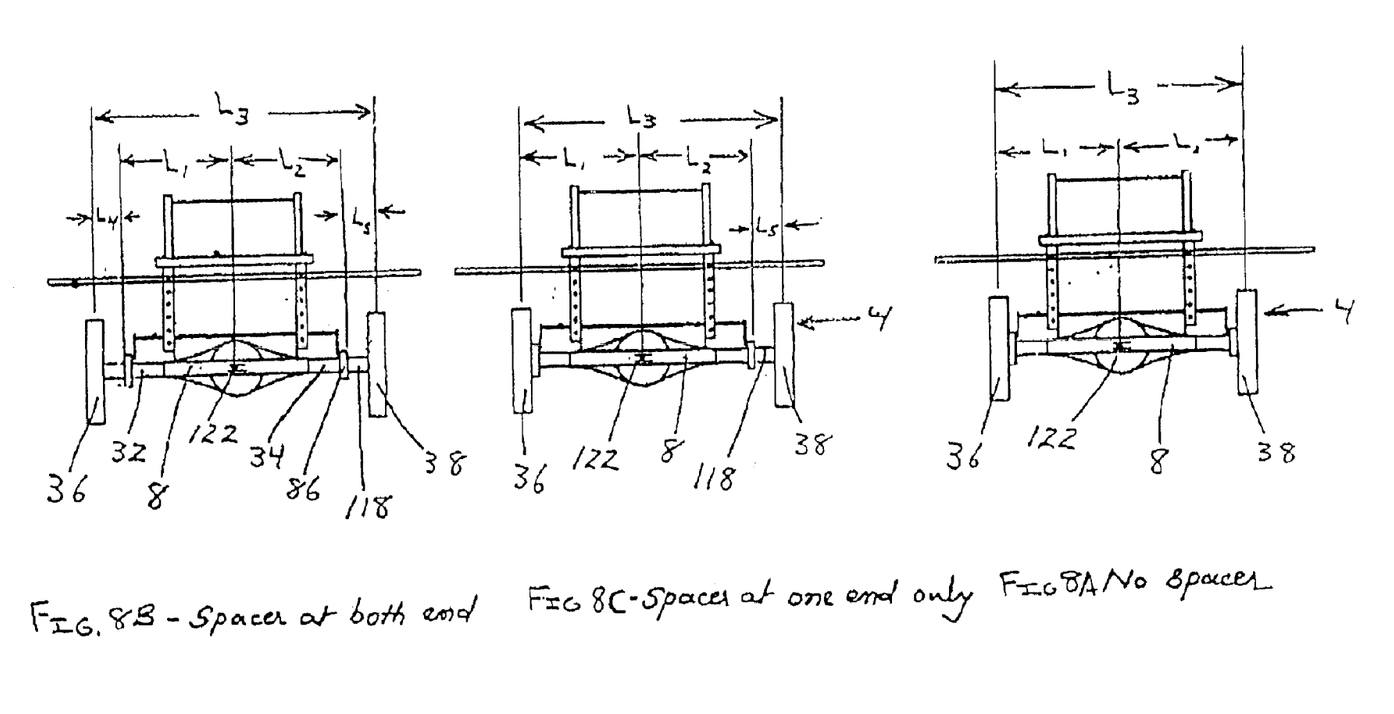
FIGS. 8A–8C are rear views of an embodiment of an axle and a spacer of the agricultural system of FIG. 1.

Track width adjustment allows independent wheel-spacing adjustment. For example, FIGS. 8A–8C provide a rear view of axle 8 in a variety of spacer configurations. FIG. 8A shows the tool assembly 4 with no spacers (item 118, FIG. 4). In FIG. 8A, a distance, L3, between the first and second wheels 36, 38 is the sum of distances L1 and L2. In each of FIGS. 8A–8C, L1 equals L2; therefore, in FIG. 8A, the first and second wheels 36, 38 are located equidistant from an axle midpoint 122.

In the embodiment of FIG. 8B, spacers 118 are installed between the brake housings 86 and the associated first or second wheel 36, 38. In FIG. 8B, the distance, L3, between the first and second wheels 36, 38 is the sum of L1, L2, L4 and L5 where distance L4 is the length of spacer 118 installed adjacent the first wheel 36, and distance L5 is the length of spacer 118 installed adjacent the second wheel 38. In FIG. 8B, the first and second wheels 36, 38 are a greater distance apart, but remain equidistant from axle midpoint 122, so long as the same length spacer 118 is installed adjacent each wheel 36, 38. In FIG. 8B, the distance L3, is greater than the distance L3 of FIG. 8A by the sum of L4 and L5.

FIG. 8C demonstrates independent wheel-spacing adjustment, whereby a spacer is only installed adjacent one of the first and second wheels 36, 38. In FIG. 8C, a spacer 118 is only installed adjacent second wheel 38. The distance L3 between the first and second wheels 36, 38 equals the sum of L1, L2, and L5. Because there is no spacer 118 adjacent first wheel 36, distance L4 (FIG. 8B) is zero and the first and second wheels 36, 38 are not equidistant from the axle midpoint 122. Second wheel 38 is distance L5 further from midpoint 122 than first wheel 36. In FIG. 8C, the distance L3 is greater than the distance L3, of FIG. 8A by the distance L5, but less than the distance L3 of FIG. 8B by the distance L4.

Referring to FIG. 8B, spacers 118 are installed by unbolting the first or second wheel 36, 38 from an axle flange (not shown), located at either end 32, 34 of axle 8, and removing the attached wheel 36, 38. The spacer 118 is then attached to the end of axle 8. The wheel 36, 38 is then reattached to the spacer second flange (not shown) to complete the installation. Referring to FIG. 4, the axle flange may be integral with the brake housing 86. In FIG. 4, the axle flange (not shown) is obscured beneath the first spacer flange 121 of spacer 118. To remove the spacer 118, the preceding steps are reversed.

Figure 9:
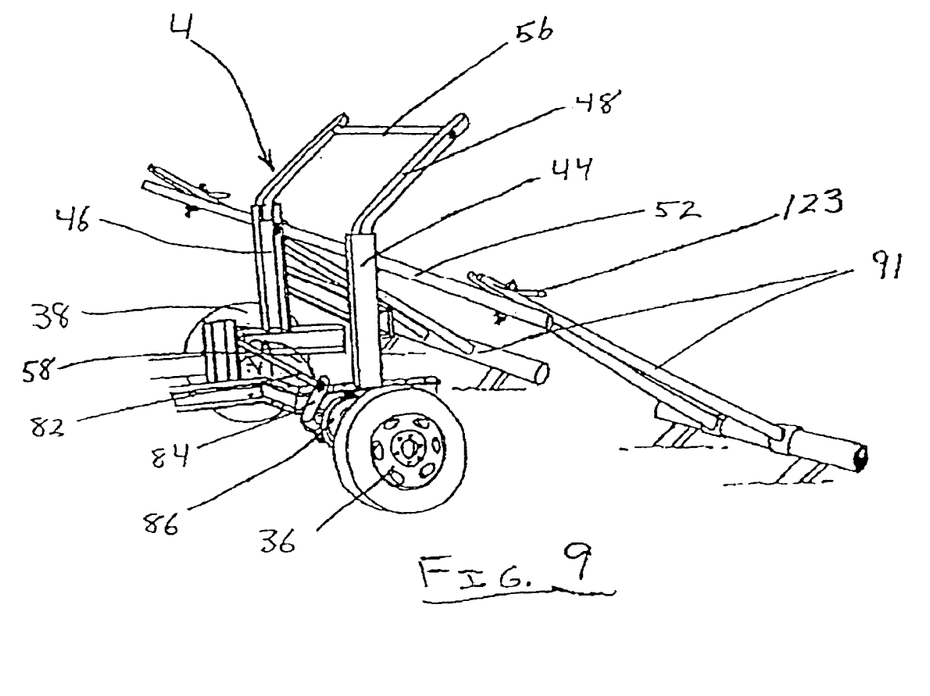
FIG. 9 is a perspective view of the embodiment of the tool assembly of FIG. 1.

The tool assembly's versatility is also improved because a variety of farm implements 91 can be directly connected to the tool assembly 4 via support arm 52 as shown in FIG. 9, without using a multi-purpose tool bar (item 97, FIG. 6). Farm implements 91 are attached to support arm 52 by lifting farm implement extensions 123 adjacent the support arm 52 and attaching the extensions 123 to the support arm 52. In one embodiment the farm implement 91 connected to support arm 52 is a cultivator. As configured in FIG. 9, the agricultural system turns the soil in preparation for planting as it is propelled. However, it will be recognized by those skilled in the art that a wide variety of farm implements such as seed drills, sprayer kits and the like can be attached to the tool assembly 4.

The agricultural system is also designed for retrofit applications whereby an existing OEM motorcycle is equipped for agricultural use. Referring to FIG. 1, the chain drive system is disconnected from the rear wheel (not shown) and drive axle (not shown) of the OEM motorcycle. The original rear brake system is disconnected from the brake pedal 76. The rear wheel and drive axle are then removed from the motorcycle. The tool assembly 4 is attached to the motorcycle drive unit frame 20 by first straddling the rear portion of frame 20 between the horizontal members 40, 42. Holes provided at the first and second attachment points (items 57 and 59, FIG. 2) are then aligned with holes (not shown) located in the frame 20, and each attachment point is fastened to frame 20. Depending upon the model motorcycle, the attachment points (items 57 and 59, FIG. 2) may align with pre-existing holes (not shown) in motorcycle frame 20. Otherwise, the holes (not shown) can be added. When attached, the tool assembly 4 configuration places the first sprocket (item 70, FIG. 3) approximately where the rear wheel (not shown) of the OEM motorcycle was originally located.

Referring to FIG. 3, the first drive chain 72 is re-sized to accommodate the diameter of first sprocket 70. Alternatively, a replacement chain may be supplied with the tool assembly 4. The first drive chain 72 is looped over the motorcycle drive unit output (not shown) and first sprocket 70 which is mounted on shaft 68 located between the tool assembly horizontal members 40, 42. The two ends (not shown) of the first drive chain 72 are then linked together. As shown in FIG. 1, the connecting rod 80 is connected to the brake pedal 76. The brake system is then adjusted for proper operation. Thus, the retrofit is accomplished with a minimum of time and expense.

Because the tool assembly 4 can attach to an unmodified motorcycle drive unit 2, as shown in FIG. 1, removal of tool assembly 4 and motorcycle reassembly is accomplished with similar ease and low cost. As shown in FIG. 3, the transmission unit 28 is disconnected from motorcycle drive output (not shown) by disconnecting the first drive chain 72. The chassis 30 is then disconnected from motorcycle frame 20. The originally supplied rear axle (not shown) and rear wheel (not shown) are then installed in their original location. The first drive chain is replaced or re-sized to accommodate the original rear sprocket. The motorcycle drive output (not shown) is then connected to the rear axle (not shown) by the original chain drive system (not shown). The rear fender and associated hardware are reinstalled, and the rear brake (not shown) is connected to brake pedal 76 and readjusted.

As described thus far, the tool assembly is connected to an unmodified motorcycle drive unit. However, installation of a diesel engine in the preceding and other embodiments provides an increased-efficiency agricultural system. For example, in a retrofit application, the originally supplied combustion engine can be replaced by a diesel engine. In one embodiment, the original engine (item 10, FIG. 1) is replaced with a 5.5 horsepower diesel engine. A variety of diesel engines may be suitable so long as the engine supplies the horsepower required for farming and is small enough to mount on the motorcycle frame (item 20, FIG. 1).

While the invention has been shown and described with reference to specific preferred embodiments, it should be understood by those skilled in the art that various changes in form and detail may be made therein without departing from the spirit and scope of the invention as defined by the following claims.

What is claimed is:

1. An agricultural system comprising:
   a motorcycle drive unit and an agricultural tool assembly, wherein a rear wheel of the motorcycle drive unit is removed and the agricultural tool assembly is attached to the motorcycle drive unit in place of the rear wheel and wherein the agricultural tool assembly is removable from the motorcycle drive unit for re-attachment of the rear wheel to the motorcycle drive unit, the agricultural system capable for use in farming.

2. The system of claim 1 wherein the agricultural tool assembly further comprises a structural chassis suitable for attachment of farm implements and adapted to be mounted on an axle having first and second ends, the structural chassis at least partially supported on first and second wheels coupled to the first and second ends of the axle.

3. The system of claim 2 further comprising a transmission unit comprising a differential gear box comprising a sprocket mounted on the axle and adapted to be connected to the motorcycle drive unit.

4. The system of claim 2 further comprising at least one spacer for a tool assembly track width adjustment.

5. The system of claim 4 wherein the tool assembly track width adjustment allows independent wheel-spacing adjustment.

6. The system according to claim 1 wherein said agricultural tool assembly further comprises a multi-purpose tool bar for securing at least one of a cultivator, a seed drill, and a sprayer kit.

7. The system according to claim 1 wherein said agricultural tool assembly further comprises a lifting mechanism.

8. The system according to claim 7 wherein said lifting mechanism comprises a lever and a pulley.

9. The system according to claim 1 wherein said agricultural tool assembly further comprises a braking system.

10. An agricultural system for use in farming comprising:
 a motorcycle drive unit wherein a rear wheel of the motorcycle drive unit is removed and an agricultural tool assembly is attached to the motorcycle drive unit in place of the rear wheel;
 the agricultural tool assembly comprising a structural chassis and an axle comprising first and second ends;
 a first wheel disposed at the first end of the axle;
 a second wheel disposed at the second end of the axle;
 a transmission unit comprising a differential gear box disposed between the first and second wheels;
 a multi-purpose tool bar for at least one of a cultivator, a seed drill, and a sprayer kit mounted on the structural chassis;
 a braking system connected to at least one of the first or second wheels; and a lifting mechanism.

* * * * *